United States Patent Office 2,857,386
Patented Oct. 21, 1958

2,857,386
ISO RESERPIC AND ISO DESERPIDIC ACIDS, SALTS AND ESTERS

Charles Ferdinand Huebner, Chatham, N. J., assignor to Ciba Pharmaceutical Products, Inc., Summit, N. J., a corporation of New Jersey No Drawing. Application April 9, 1956
Serial No. 576,836

9 Claims. (Cl. 260—286)

This application is a continuation-in-part of my copending applications Serial No. 500,047, filed April 7, 1955 (abandoned), and Serial No. 513,908, filed June 7, 1955 (abandoned), respectively.

This invention relates to new acids, their esters and the salts of these compounds, and to processes for the preparation thereof. More particularly the invention relates to acids of the formula:

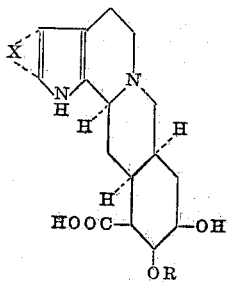

wherein X represents the unsubstituted or substituted remainder of a benzene nucleus and R stands for a lower alkyl group. The invention relates also to the esters of the above acids and to the salts of these compounds. As esters there are contemplated especially those in which the carboxyl group is esterified with a lower alkanol and the hydroxy group is free or esterified, e. g. with an aliphatic, araliphatic, aromatic or heterocyclic acid, such as lower fatty acids, e. g. acetic or propionic acid, phenyl carboxylic acids, e. g. benzoic acid or preferably lower alkoxy-benzoic acids such as 4-methoxy-benzoic acid, 3,4-dimethoxy-benzoic acid, 3,4,5-trimethoxy-benzoic acid, 3,4-methylenedioxy-benzoic acid, cinnamic acids, e. g. methoxy-cinnamic acid, dimethoxy-cinnamic acid or 3,4,5-trimethoxy-cinnamic acid, monocyclic heterocyclic carboxylic acids, e. g. furane-2-carboxylic acids, thiophene-2-carboxylic acid or nicotinic acid or aryl sulfonic acids, e. g. toluene-sulfonic acids.

Especially valuable are compounds of the formula:

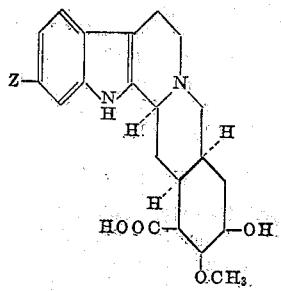

wherein Z stands for methoxy or hydrogen, the esters and salts thereof.

The new compounds possess valuable properties. They absorb U. V.-light in that range which causes sunburn (290–320 m$\mu$) and can be used as active ingredients in sun screen compositions. They can be made up into such compositions according to the customary methods employed in making such preparations. They may be incorporated into a hydrophilic ointment containing, e. g. glycols, higher aliphatic alcohols such as stearyl alcohol, white petrolatum, distilled water etc. They are, furthermore, valuable intermediates for the preparation of compounds having related structure, which may be used in a wide field of applications, e. g. as sedative and hypotensive active medicaments or as active ingredients of sun screens. Thus, by oxidation with lead tetraacetate, the new acids or esters thereof are converted into the corresponding tetradehydro-compounds, which may be used technically as valuable active ingredients of sun screen compositions and which are disclosed in my copending application Serial No. 481,493, filed January 12, 1955, now Patent No. 2,809,198. Furthermore, they can be converted by reaction with reactive esters of higher alcohols, advantageously lauryl alcohol, into the corresponding quaternary compounds which can be used as disinfectants; they show, for example, a marked activity against *Staphylococcus aureus*.

These new compounds are obtained by epimerizing compounds of the formula:

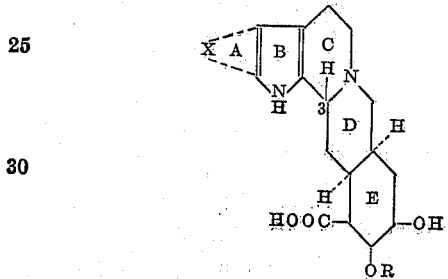

wherein X and R have the aforesaid meaning, or esters thereof of their salts in 3-position. This can be done by treatment with Lewis acids, for example aliphatic carboxylic acids or strong acids, such as organic sulfonic acids, advantageously an aromatic sulfonic acid, such as p-toluene-sulfonic acid in a solvent such as collidine, or strong mineralic acids, e. g. hydrohalic acids or perchloric acid, or borontrifluorid, or with strong bases under extreme conditions, for example alkali or earth alkali metal hydroxides in diethylene glycol at a temperature of about 200° C. Depending on the substituents in rings A and E, the epimerization proceeds with varying ease. Whereas compounds like reserpine or reserpic acid etc. are epimerized under comparatively mild conditions, such as treatment with toluene sulfonic acid in collidine or acetic anhydride, compounds of the deserpidine-series, lacking the methoxy group in ring A are advantageously treated with strong mineralic acids or strong bases, such as hydrobromic acid or potassium hydroxide. Depending on the conditions of the reaction, hydrolysis of the ester groups may occur.

The new compounds are also obtained when compounds of the formula:

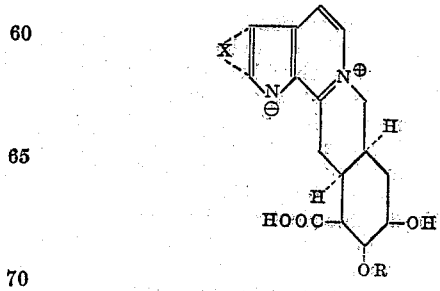

or a salt thereof, wherein R and X have the aforesaid meaning, are treated with reducing agents capable of converting the pyridinium ring into a tetrahydropyridine ring without reducing the free or esterified carboxyl group, such as sodium borohydride or by hydrogenation in methanol over platinum oxide at a pH of 10, which is achieved by the addition of potassium hydroxide.

Compounds obtained, having a free hydroxyl and a free or esterified carboxyl group, may be partially or completely esterified as the case may be. Thus, a free acid may be converted into its esters with alcohols, for example alkanols, e. g. by treatment with an agent capable of converting a free carboxyl group into an esterified carboxyl group, such as diazo alkanes, or alcohols in the presence of a strong acid. Compounds having a free hydroxyl group may be esterified, e. g. with an araliphatic, aliphatic, aromatic or heterocyclic acid, such as lower fatty acids, e. g. acetic or propionic acid, phenyl carboxylic acids, e. g. benzoic acid or preferably lower alkoxy-benzoic acids, such as 4-methoxy-benzoic acid, 3,4-dimethoxy-benzoic acid, 3,4,5-trimethoxy-benzoic acid, 3,4-methylenedioxy-benzoic acid, cinnamic acids, e. g. 4-methoxy-cinnamic acid, 3,4-dimethoxy-cinnamic acid or 3,4,5-trimethoxy-cinnamic acid, monocyclic heterocyclic carboxylic acids, e. g. furane-2-carboxylic acid, thiophene-2-carboxylic acid or nicotinic acid, or aryl sulfonic acids, e. g. toluene-sulfonic acids. The esterification of the free hydroxyl group can be carried out, for example by treatment with an agent capable of converting a free hydroxyl group into an esterified hydroxyl group, such as reactive functional derivatives of organic carboxylic or sulfonic acids, such as halides or anhydrides. On the other hand, esters obtained may be converted into the free acid or the free hydroxy compounds. If the compounds obtained contain an esterified carboxyl and an esterified hydroxyl group, both ester groups may be split simultaneously, or first the esterified hydroxyl group, and subsequently the esterified carboxyl group.

Thus, one may work with different alkaline saponifying agents or with the same but under different conditions, e. g. in the presence or absence of water, at a lower or higher temperature or for a longer or shorter period of time. For example, when the compounds are heated for a comparatively long time with the solution of an alkali hydroxide, such as potassium hydroxide, in an alcohol, such as methanol, both ester groups are hydrolyzed. When the treatment is performed with the same agent under milder conditions, e. g. for a short time only the esterified hydroxyl group is split.

For partial saponification, however, there is used as alkaline saponifying agent especially one capable of converting an esterified hydroxyl group into a free hydroxyl group with the formation of an ester, that is to say, by alcoholysis, the carbomethoxy group being re-esterified, depending on the conditions employed. It is thus of advantage to work in an anhydrous alcohol in the presence of an alcoholate, such as an alkali metal or aluminum alcoholate or some other alcoholyzing agent, such as sodium carbonate or piperidine. For example, in absolute methanol in the presence of an alkali methylate, such as sodium methylate or aluminum tertiary butylate, piperidine, or sodium carbonate, there is formed the acid methyl ester. When the alcoholysis is carried out in other absolute alcohols, such as ethanol or butanol in the presence, for example, of the corresponding alcoholates, such as sodium ethylate or sodium butylate or other alcoholyzing agents, there are obtained by re-esterification the corresponding acid alcohol esters, such as ethyl ester or butyl ester. For conversion into the free acid, the esters can be further treated in an alkaline medium, e. g with an alkaline solution of an alkali hydroxide such as a methanolic solution of potassium hydroxide.

The above outlined subsequent reactions may be carried out optionally and in any desired order. The invention comprises, furthermore, any modification of the above outlined process, wherein a compound obtainable as an intermediate at any stage of the process is used as starting material and any or all of the remaining steps are carried out.

Depending on the method of working, the new compounds are obtained in the free form or as salts. If the compounds possess a free carboxyl group, it is possible to prepare salts thereof, e. g. by reaction with a metal hydroxide a metal salt, e. g. an alkali metal salt, such as sodium or potassium salt. On the other hand, the new compounds may be converted into their salts with acids, for example by treating them with inorganic or organic acids, such as hydrohalic acids, sulfuric, phosphoric, nitric, hydroxyethane sulfonic, toluene sulfonic, acetic, tartaric or citric acid. From the salts the free compounds can be obtained in the usual manner.

In the aforedescribed reactions the starting materials can also be used in the form of salts thereof. Depending upon the nature of the starting materials with regard to optical behavior, laevo-rotary, dextro-rotary or racemic compounds are obtained. These different forms of the new compounds are equally useful and are part of my invention.

The starting materials for the process of isomerization, as far as they are desired from plant material of Rauwolfia species or from materials derived therefrom, are known. Such starting materials are, for example, reserpic acid and its esters like reserpine and deserpidic acid and its esters like deserpidine, which are described in copending application Serial No. 526,780, filed August 5, 1955, now Patent No. 2,824,874, of E. Schlittler and Serial No. 487,719, filed February 11, 1955, of Paul R. Ulshafer. Other compounds of this kind can be synthesized according to copending application Serial No. 576,833 of M. Kuehne, filed on even date herewith (abandoned).

The starting materials used for the reduction are known (cf. my copending applications Serial No. 481,493, filed January 12, 1955, now Patent No. 2,809,198, and Serial No. 500,046, filed April 7, 1955, matured into U. S. Patent No. 2,786,843, issued March 26, 1957), or can be prepared by oxidation of the corresponding saturated compounds which are disclosed in the above referred to copending applications of E. Schlittler, Paul R. Ulshafer and M. Kuehne.

The following examples will serve to illustrate the invention, the temperatures being given in degrees centigrade.

*Example 1*

1 g. of methyl reserpate is refluxed with 10 ml. of acetic anhydride for six hours. About half of the acetic anhydride is removed in vacuo and 50 g. of ice water added to the residue. After hydrolysis of the excess acetic anhydride, the small amount of black tarry material separating is removed. Ammonium hydroxide is added with cooling to the filtrate. The crude precipitated methyl O-acetyl-3-iso-reserpate is filtered and purified by washing with ethanol in which it is rather insoluble. It melts at 260–265°. By recrystallization from acetone-water, methyl O-acetyl-3-iso-reserpate is obtained in fine needles melting at 270–271°, $[\alpha]_D^{25} = -130°$ (chloroform). Its infrared spectrum in Nujol (mineral oil) mull shows the following very strong to strong bands given in reciprocal centimeters: 1728, 1464, 1370, 1350, 1276, 1248, 1209, 1154, 1117, 1098, 1031, 795.

*Example 2*

50 mg. methyl O-acetyl reserpate are refluxed for 16 hours in 5 ml. of acetic acid. After removal of the acetic acid by distillation, addition of water and aqueous ammonia, methyl O-acetyl-3-iso-reserpate described in Example 1 is obtained.

*Example 3*

3 g. methyl reserpate are refluxed in 20 ml. of collidine containing 200 mg. of p-toluenesulfonic acid for 4 hours. The reaction mixture is cooled, gently shaken with dilute ammonium hydroxide to remove the acid catalyst, and the collidine distilled in vacuo to a small volume. 50 ml. of water are added and the solvents completely removed by distillation. The dark brown syrup resulting is dissolved in 30 ml. of ethanol and made acid (pH 3) by the careful addition of 5 N aqueous nitric acid. Scratching and cooling causes the separation of methyl 3-iso-reserpate nitrate which after standing overnight is collected. It crystallizes from water and melts then at 265–270°. It analyzes for the formula $C_{23}H_{31}N_3O_8$.

It can be converted to the base by addition of ammonium hydroxide to its hot aqueous solution. Recrystallization from methanol-water yields methyl 3-iso-reserpate melting at 220–221°, $[\alpha]_D^{25} = -62°$ (ethanol). Its infrared spectrum in Nujol (mineral oil) mull shows the following very strong to strong bands given in reciprocal centimeters: 1738, 1631, 1501, 1463, 1378, 1369, 1345, 1313, 1276, 1267, 1243, 1200, 1158, 1114, 1088, 1037, 997, 831, 807.

Methyl 3-iso-reserpate can be esterified, for example by treatment with acetic acid anhydride in pyridine at room temperature to yield methyl O-acetyl-3-iso-reserpate described in Example 1.

*Example 4*

5 g. of methyl O-acetyl-3-iso-reserpate are refluxed in a solution of 0.5 g. of sodium in 200 ml. of anhydrous methanol for one hour. The methanol is concentrated in vacuo to a small volume, diluted with water and the mixture extracted with chloroform. The syrupy residue remaining after removal of the solvent is dissolved in a few ml. of methanol and, after seeding, methyl 3-iso-reserpate, described in Example 3 is obtained.

*Example 5*

To a cooled solution of 1.6 g. of methyl 3-iso-reserpate in 15 ml. of pyridine is added 3.5 g. p-toluenesulfonyl chloride. After standing overnight, ice is added to the mixture and the voluminous precipitate of fine needles is filtered and washed with water. It is suspended in 50 ml. of chloroform and shaken during the careful addition of 1 N sodium hydroxide. The solid gradually dissolves in chloroform. The chloroform is washed with water, dried over sodium sulfate and concentrated to dryness in vacuo leaving the crystalline tosylate as a residue. Recrystallization from acetone-water yields methyl O-p-toluenesulfonyl-3-iso-reserpate as fine, hair-like needles, melting at 229–230°, $[\alpha]_D^{24} = -58°$ (chloroform). Its infrared spectrum in Nujol (mineral oil) shows the following very strong to strong bands given in reciprocal centimeters: 1738, 1631, 1465, 1367, 1350, 1275, 1211, 1181, 1153, 1129, 1111, 1098, 951, 930, 922, 889, 837, 816, 668.

*Example 6*

5 g. of reserpine are refluxed in 50 ml. of acetic anhydride for 18 hours. About 40 ml. anhydride are distilled off in vacuo and the remainder decomposed by the addition of ice. Ammonia is added and the crude base extracted with chloroform. The dark syrupy residue remaining after removal of the chloroform is dissolved in about 5 ml. of ethanol and carefully acidified with 5 N aqueous nitric acid. 3-iso-reserpine soon separates as the crystalline nitrate. This is filtered, washed with ethanol and converted to the base by shaking with chloroform in the presence of excess N aqueous sodium hydroxide. The chloroform solution is washed with water, dried over sodium sulfate and the solvent evaporated. The light yellow syrupy residue crystallizes on scratching in the presence of a few ml. of ethanol. The solid is filtered and recrystallized from ethanol-water to yield 3-iso-reserpine which melts at 150–155° with frothing, $[\alpha]_D^{24} = -164°$ (chloroform). Its infrared spectrum in Nujol (mineral oil) mull shows the following very strong to strong bands given in reciprocal centimeters: 1743, 1718(+4), 1630, 1596, 1507, 1463, 1418, 1379, 1335, 1274, 1227, 1161, 1123, 1003, 981, 802, 760. 3-iso-reserpine is readily distinguishable from reserpine by its low melting point and high solubility in acetone. 3-iso-reserpine can be converted into tetradehydro reserpine as follows:

To a stirred solution of 1 g. of 3-iso-reserpine in 25 ml. of acetic acid held at 25° is added slowly and with external cooling, 55 ml. of a 0.063 M lead tetraacetate solution in acetic acid.

The addition is at such a rate that the oxidant is never in large excess. Upon completion of the reaction the lead tetraacetate is completely consumed. Most of the acetic acid is then removed by distillation in vacuo. Water is then added followed by chloroform. 50 percent aqueous sodium hydroxide solution is added with agitation and cooling till the aqueous phase is just basic (pH 9–10). The chloroform phase is then separated and washed with water. Enough 8 N ethanolic hydrogen chloride is added to the chloroform solution to bring the pH to 3. The chloroform solution is evaporated in vacuo to dryness. The residue is dissolved in boiling water and filtered hot. On addition of 6 N hydrochloric acid, tetradehydroreserpine hydrochloride crystallizes. It melts at 200–205° (with decomposition).

*Example 7*

A solution of 0.5 g. of methyl 3-iso-reserpate and 1.5 g. of 3,4,5-trimethoxybenzoyl chloride in 15 ml. of pyridine are allowed to stand for 5 days in the icebox. Three-quarters of the pyridine are distilled off in vacuo, water is added and the mixture is made alkaline with dilute sodium hydroxide and extracted with ethyl acetate. The ethyl acetate is washed with dilute hydrochloric acid, dilute sodium hydroxide and water. The solvent is removed in vacuo and the residue dissolved in a small volume of ethanol. It is made acidic with 8 N ethanolic hydrogen chloride and a large volume of ether is added to precipitate the salt, which is suspended in chloroform and converted to the base by shaking with dilute ammonia. The residue remaining after removal of the chloroform is taken up in a small volume of ethanol and acidified with 5 N nitric acid. The crystalline 3-iso-reserpine nitrate is collected, converted to the base and recrystallized from ethanol-water as described in Example 6. The thus obtained 3-iso-reserpine melts at 152–155°. The melting point of the mixture with a sample prepared by the direct isomerization of reserpine as described in Example 6 is unchanged.

*Example 8*

To a solution of 300 mg. of methyl tetradehydroreserpate hydrochloride in 20 ml. of methanol is added in portions 100 mg. of sodium borohydride. After refluxing for thirty minutes, the excess sodium borohydride is destroyed by the addition of aqueous hydrochloric acid to pH 4. After removal of the methanol by distillation in vacuo, 5 ml. of water is added and the mixture basified with ammonia. It is extracted with chloroform and the chloroform evaporated in vacuo. The residue is dissolved in ethanol and acidified with 5 N nitric acid. Methyl 3-iso-reserpate separates as the crystalline nitrate, M. P. 265–270°.

*Example 9*

Tetradehydro-reserpine hydrochloride is reduced in the manner identical to that described in Example 8. The reaction mixture is worked up as described in Example 8. The residue remaining after evaporation of the chloroform solution is recrystallized from ethanol to yield 3-iso-reserpine, M. P. 152–155°.

*Example 10*

1 g. of methyl 3-iso-reserpate is refluxed in a mixture of 30 ml. of methanol, 9 ml. of N aqueous sodium hydroxide and 3 ml. of water for two hours. Most of the methanol is distilled off in vacuo and the solution is diluted to 20 ml. with water. Nitric acid (1 part by volume of acid to 3 parts by volume of water) is added dropwise with cooling till the mixture is acid to Congo red. 3-iso-reserpic acid nitrate crystallizes. Recrystallized from water, it melts at 266–270°.

*Example 11*

600 mg. of 3-iso-reserpic acid nitrate is dissolved in 20 ml. of pyridine and treated with 4 ml. of acetic acid anhydride. After standing at room temperature overnight, it is evaporated in vacuo to a few ml. The crystals which appear are collected with ethanol in which they are rather insoluble. The O-acetyl-3-isoreserpic acid nitrate is suspended in water and dilute ammonia added carefully till solution occurs. Acetic acid is added to bring the mixture to pH 6. The free O-acetyl-3-iso-reserpic acid which separates is collected by filtration. It is recrystallized from a large volume of water and melts at 265° (with decomposition).

The O-acetyl-3-iso-reserpic acid obtained is suspended in methanol and treated with an excess of ethereal diazomethane. After standing for 30 minutes, acetic acid is added in slight excess to destroy the excess diazomethane. The solution is evaporated to dryness, the residue dissolved in chloroform and the chloroform shaken out with dilute ammonia. The chloroform solution is evaporated to dryness and the residue crystallized from acetone to yield methyl O-acetyl-3-iso-reserpate described in Example 1.

*Example 12*

To a solution of 2 g. of deserpidine in 50 ml. of acetic acid held at 50° is added with stirring over a period of 30 minutes 190 ml. of a solution of 0.036 mole of lead tetraacetate in acetic acid. After disappearance of the oxidant (negative starch-iodide test) the acetic acid is partially distilled off under reduced pressure until a volume of about 10 ml. is reached. The solution is diluted with 150 ml. of chloroform and made alkaline to a pH of 9–10 by careful addition of 50 percent aqueous sodium hydroxide with cooling and agitation. The chloroform layer is separated, washed with a small amount of water and acidified to pH 3 with 3 N ethanolic hydrogen chloride. Evaporation of the chloroform to dryness under reduced pressure leaves tetradehydrodeserpidine hydrochloride.

The tetradehydrodeserpidine hydrochloride so obtained is dissolved in 50 ml. of methanol and 0.5 g. of sodium borohydride is slowly added with cooling. After standing for 30 minutes the greater part of the methanol is removed under reduced pressure, 1 ml. of water is added and the solid 3-isodeserpidine is extracted with 50 ml. of chloroform. The chloroform solution is washed with water, dried over sodium sulfate and evaporated to dryness under reduced pressure. The residue is dissolved in 15 ml. of ethanol and made acidic to pH 3 by the careful addition of 5 N aqueous nitric acid. Crystallization of 3-isodeserpidine nitrate occurs which is recrystallized from methanol and melts at 195–200° (dec.). The purified free base is obtained by agitating the 3-isodeserpidine nitrate in chloroform with dilute aqueous ammonia, the free base being isolated from the chloroform solution upon evaporation of the solvent. The 3-isodeserpidine is very readily soluble in solvents from which it crystallizes and is therefore conveniently handled in the form of its salts.

What is claimed is:

1. A member of the group consisting of compounds of the formula:

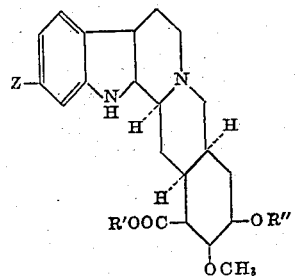

wherein Z stands for a member of the group consisting of hydrogen and methoxy, R' for a member of the group consisting of hydrogen and lower alkyl and R" for a member of the group consisting of hydrogen, lower alkoyl, lower alkoxy-benzoyl, lower alkoxy-cinnanoyl and p-toluene-sulfonyl radicals, and the acid addition salts thereof.

2. 3-iso-reserpic acid.
3. 3-iso-deserpidine.
4. 3-iso-reserpine.
5. Methyl 3-iso-reserpate.
6. Methyl O-acetyl-3-iso-reserpate.
7. A process which comprises treating a member of the group consisting of compounds of the formula:

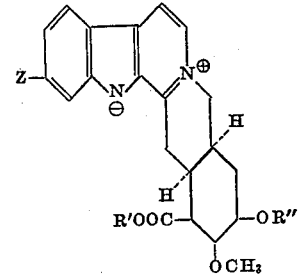

in which Z stands for a member of the group consisting of hydrogen and methoxy, R' for a member of the group consisting of hydrogen and lower alkyl and R" for a member of the group consisting of hydrogen, lower alkoyl, lower alkoxy-benzoyl, lower alkoxy-cinnamoyl and p-toluene sulfonyl radicals, and acid addition salts thereof with a reducing agent capable of converting the pyridinium ring into a tetrahydro pyridine ring without reducing carboxyl group, such agent being selected from the group consisting of sodium boron hydride and catalytically activated hydrogen in alkaline medium.

8. Methyl 3-iso-deserpidate.
9. Methyl O-p-toluenesulfonyl-3-iso-reserpate.

References Cited in the file of this patent

MacPhillamy: Jour. Am. Chem. Soc., vol. 77, pages 1071–1072 (February 1955).